United States Patent [19]
Feustel et al.

[11] 3,747,725
[45] July 24, 1973

[54] POWER STEERING SYSTEM WITH AUXILIARY PUMP

[75] Inventors: James R. Feustel, Taylor; Warren A. Van Wicklin, Jr., Dearborn, both of Mich.

[73] Assignee: Ford Motor Company, Dearborn, Mich.

[22] Filed: Mar. 15, 1971

[21] Appl. No.: 124,081

[52] U.S. Cl. .............................. 180/79.2 R, 60/405
[51] Int. Cl. ............................................. B62d 5/08
[58] Field of Search ................ 180/79.2 R; 60/52 S, 60/405

[56] References Cited
UNITED STATES PATENTS
3,613,818   10/1971   Schubert et al. ............... 180/79.2 R
2,954,671   10/1960   Kress ................................... 60/525
3,407,894   10/1968   Thompson et al. ......... 180/79.2 RX

*Primary Examiner*—Benjamin Hersh
*Assistant Examiner*—John A. Pekar
*Attorney*—John R. Faulkner and Robert W. Brown

[57] ABSTRACT

Described is a vehicle power steering system having a primary pump and a secondary pump for supplying hydraulic fluid to a steering assist mechanism. Sensing means, responsive to fluid mass flow rate through an orifice, are provided for causing actuation of valve means to disconnect the primary pump, upon failure thereof, from the steering assist mechanism and to connect the auxiliary pump thereto.

11 Claims, 3 Drawing Figures

Patented July 24, 1973

Power Steering Gear Assy.

INVENTORS
Warren A. Van Wicklin Jr.
James R Feustel
BY John R. Faulkner
Robert W. Brown
ATTORNEYS

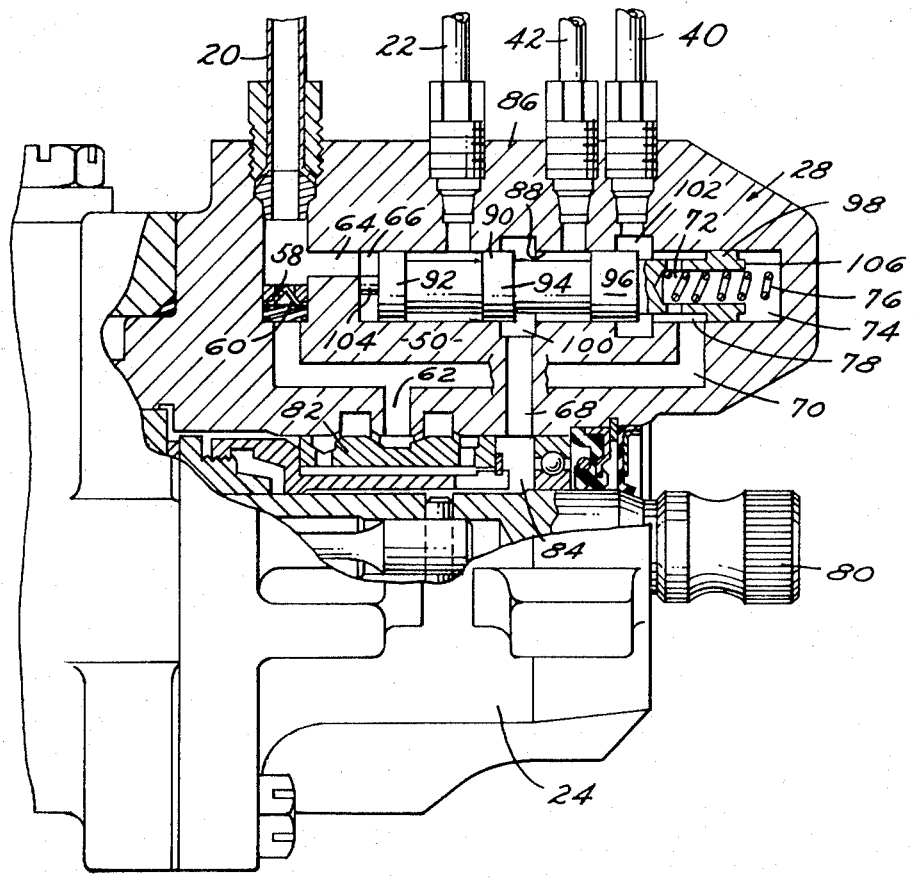

POWER STEERING SYSTEM WITH AUXILIARY PUMP

BACKGROUND OF THE INVENTION

This invention relates to a vehicle hydraulic power steering system having a primary pump and a secondary or auxiliary pump. The invention is particularly suitable for use in a vehicle power steering system of this kind wherein the primary pump is driven by the vehicle engine and normally supplies hydraulic fluid to a steering assist mechanism and wherein the auxiliary pump is driven directly or indirectly by the vehicle wheels and is automatically connected to the steering assist mechanism upon failure of the primary pump or the hydraulic circuitry connected thereto.

Power steering systems of the kind described above are well known. An example of such a system may be seen in U.S. Pat. No. 3,407,894, issued Oct. 29, 1968, in the name of William B. Thompson et al.

A suitable secondary power steering system should furnish sufficient hydraulic fluid flow at adequate pressure to provide normal power steering performance at vehicle forward speeds in excess of a predetermined low value, such as 5 miles per hour. Moreover, the secondary system should be responsive to any significant reduction in hydraulic fluid flow rate to the steering assist mechanism from the engine driven pump to quickly actuate the means for connecting the auxiliary pump to the steering assist mechanism. Also, the sensing mechanism used to indicate a primary pump or hydraulic circuit failure should function over the entire steering system operating temperature range and should be able to distinguish between the flow of hydraulic fluid having little or no air content and hydraulic fluid having a substantial quantity of air mixed therewith. Furthermore, the secondary system should operate quietly, have a durability equivalent to that of the primary power steering system, operate independently of the engine and electrical system, and have a single hydraulic fill point where the hydraulic fluid level for both the primary and auxiliary pump and hydraulic circuits may be checked. The power steering system of the invention can satisfy these requirements.

SUMMARY OF THE INVENTION

In order for a secondary power steering system to be operable, means must be provided for sensing a failure of the primary power steering system or pump to cause the secondary system to come into operation. It has been proposed by others that this sensing means comprise a pressure switch which would energize a secondary or auxiliary pump, or that a valve be used which senses the primary pump pressure and shifts upon loss thereof. However, these methods for detecting a failure of the primary power steering supply system are not entirely satisfactory because failure of the primary hydraulic power steering supply system is determined by sensing the pressure of the primary hydraulic supply circuit and comparing that pressure with some more or less arbitrary reference pressure. In most vehicle power steering systems in use today, an open-center valve is used in the steering assist mechanism so that the primary pump output pressure is quite low except during steering maneuvers. In the event of a primary system failure where there is a total or partial loss of hydraulic fluid, the primary pump acts as an air compressor and may supply an output pressure substantially equivalent to the low hydraulic fluid pressure which occurs during normal primary system operation at times other than during a steering maneuver. Thus, the prior art pressure sensing means may not detect all cases of failure in the primary hydraulic supply circuit.

In accordance with the invention, a vehicle power steering system having a primary and a secondary or an auxiliary pump includes a transfer valve for altering the fluid flow circuits of the primary and auxiliary pumps. Operation of the transfer valve is controlled by pressure differential sensing means which determine the mass flow rate in the primary hydraulic supply circuit. Should the mass flow rate become insufficient in magnitude, the transfer valve disconnects the primary hydraulic supply circuit from the steering assist mechanism and connects the auxiliary hydraulic supply circuit to the steering assist mechanism so that power-assisted steering is retained.

The mass flow rate which controls the operation of the transfer valve is sensed by causing the fluid in the primary hydraulic supply circuit to flow through fluid flow restrictive means preferably in the form of a calibrated orifice. This produces a pressure differential across the orifice which may be used to control the operation of the transfer valve. The magnitude of the pressure differential is determined in part by the density characteristics of the fluid passing therethrough. Thus, if the hydraulic fluid becomes mixed with air, for example, by a failure in the primary circuit, the pressure differential across the orifice is reduced and this reduction is used to cause the transfer valve to shuttle, thereby, to connect the auxiliary pump to the steering assist mechanism. A one-way valve, such as a check valve, is placed hydraulically in series with the orifice and the pressure differential may be taken across this combination of means for restricting fluid flow.

BRIEF DESCRIPTION OF THE DRAWINGS

FIG. 3 is a detailed sectional view of a steering gear having incorporated therein and integral therewith a transfer valve and a pressure sensing means constructed in accordance with the invention.

DETAILED DESCRIPTION OF THE INVENTION

Figure 1:
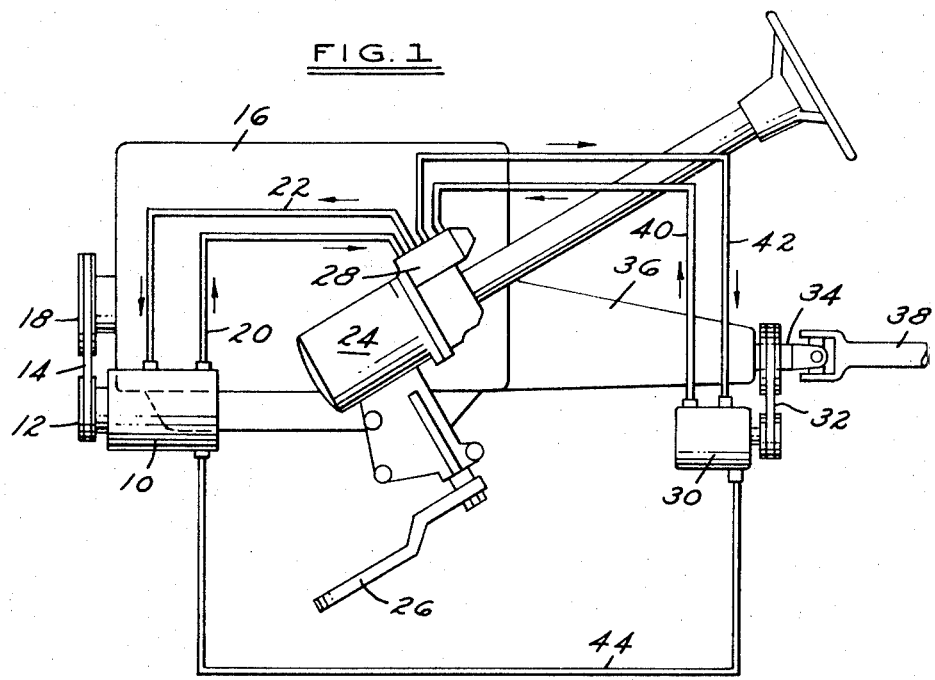
FIG. 1 is a schematic elevational view of components which may be utilized in the practice of the invention.

With reference now to FIG. 1, there is shown a schematic elevational view of a motor vehicle power steering system having components which may be utilized in practicing the invention. The system includes a primary hydraulic circuit the main element of which is a hydraulic pump 10, preferably of the positive displacement type, having as a means for driving it a pulley 12. The pulley 12 of the primary hydraulic pump 10 is driven by a belt 14. A vehicle engine 16 has an output shaft and pulley 18 to which the belt pulley 14 is connected to rotate the drive pulley 12 of the primary hydraulic pump 10. The primary hydraulic pump 10 has an output line 20 and a return line 22.

A steering assist mechanism in the form of a power steering gear unit 24 preferably is connected to the vehicle chassis in a known manner. The power steering gear unit 24 preferably is of the type having a piston with an integral worm gear which is moveable upon the application in a known manner of fluid pressure to one side or the other of it. The power steering gear unit includes a pitman arm 26 which is attached to steering linkage (not shown) and which rotates through an arc to cause movement of the vehicle wheels.

A combination fluid mass flow rate sensing means and transfer valve 28 is attached to, and preferably is integral with, the steering gear 24.

The backup power steering system includes a secondary or auxiliary hydraulic pump 30. For convenience of illustration, the auxiliary pump 30 is shown as being driven by a belt and pulley combination 32 attached to the output shaft 34 of a transmission 36 connected to the engine 16. The transmission output shaft 34 conventionally is connected to a vehicle drive shaft 38 which, in turn, is connected to the drive wheels of the motor vehicle. Rotation of the drive wheels (not shown) causes rotation of the belt-pulley assembly 32 and of the auxiliary pump 30. Thus, auxiliary pump 30 is driven, directly or indirectly, by the drive wheels of the vehicle, while the primary hydraulic pump 10 is driven by the vehicle engine. The auxiliary pump 30 could be mounted within the housing of the transmission 36 and might be similar in design to the hydraulic pump described in the aforementioned U.S. Pat. No. 3,407,894. Also, the auxiliary pump 30 could be driven by the rear axle or differential of a vehicle so equipped.

The auxiliary pump 30 has a fluid output line 40 and a fluid return line 42. These output and return lines 40 and 42 are connected to the combination sensing means and transfer valve 28, as are the output and return lines 20 and 22 of the primary hydraulic pump 10. Preferably, both the primary hydraulic pump 10 and the auxiliary hydraulic pump 30 have integral reservoirs to which the respective pump return lines 22 and 42 are connected. The primary and auxiliary hydraulic pumps may have a common reservoir, separate reservoirs, or physically separate reservoirs interconnected by a hydraulic line 44. It is preferred that the reservoirs be interconnected so that they may have a common fluid-fill location, which may also serve for checking hydraulic fluid level in the respective pumps.

Figure 2:
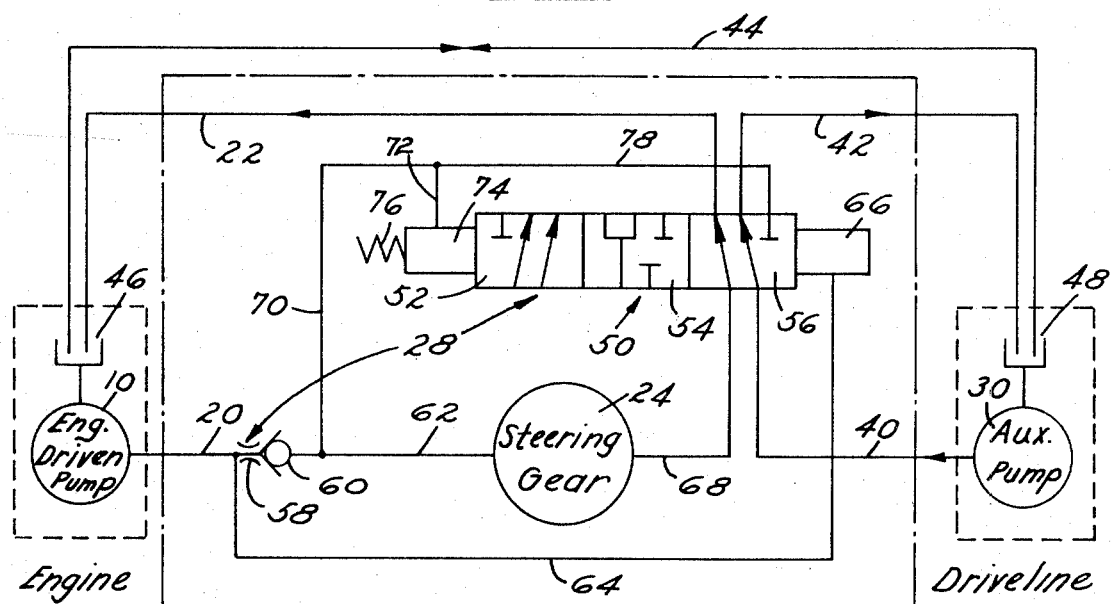
FIG. 2 is a schematic diagram of hydraulic circuitry arranged in accordance with the invention.

With reference now to FIG. 2, there is shown a schematic diagram of hydraulic circuitry constructed in accordance with the invention. The hydraulic circuitry includes the engine driven pump 10 having a reservoir 46. The pump 10 is enclosed by dotted lines to illustrate that it is preferably located in the engine area of the motor vehicle. The secondary or auxiliary hydraulic pump 30 is also enclosed by dotted lines to illustrate that it is preferably in the drive line area, and it includes a reservoir 48. The reservoirs 46 and 48 are preferably interconnected by the hydraulic line 44 to permit fluid flow in either direction as shown in FIG. 2.

The combination mass flow rate sensing means and transfer valve 28 includes a pilot-operated, five-way, two-position transfer valve 50. The transfer valve 50 is shown as having three positions 52, 54, and 56. However, only positions 52 and 56 are stable positions. Position 54 is an intermediate unstable valve position which occurs as the valve shifts from one of its stable positions to the other.

The mass flow rate sensing means comprises an orifice 58 and one-way fluid flow means in the form of a check valve 60, the orifice 58 and the check valve 60 being hydraulically connected in series with one another. Preferably, the steering gear 24 and the remainder of the items enclosed within the dot-dash lines of FIG. 2 are contained within an integral power steering gear assembly.

In operation, the fluid output from the pump 10 passes through its output line 20, through the orifice 58 and check valve 60 where a pressure drop occurs, through a passage or hydraulic line 62, and into the steering gear 24. The orifice 58 may be calibrated or sized, for example, such that at normal flow rates a pressure differential of about 15 pounds per square inch is produced across the orifice. The check valve 60, the primary function of which is to prevent reverse flow from the power steering gear assembly into the output line 20, preferably has a cracking pressure of approximately 2 pounds per square inch. The combined pressure drop across the orifice 58 and the check valve 60 provides an indication of the mass flow rate therethrough. The pressure at the upstream side of the orifice 58 is applied through the hydraulic line or passage 64 to a pilot area 66 of the transfer valve 50. Thus, the pressure in the pump output passage 20 is applied through the hydraulic line or passage 64 to the pilot sensing area 66 to urge the valve 50 toward its stable position 56. When the transfer valve is held in this stable position 56, the fluid from the steering gear 24 passes through hydraulic line or passage 68 and the transfer valve and is returned by return line 22 to the engine-driven pump reservoir 46. The pressure on the downstream side of the check valve 60 is applied through the hydraulic lines or passages 70 and 72 to another pilot area 74 of the transfer valve 50. The fluid pressure in this pilot area 74 combined with the force produced by resilient means in the form of a spring 76 urge the transfer valve toward its other stable position 52. However, if the pressure differential across the orifice 58 and check valve 60 is sufficiently great, the fluid pressure in the pilot area 74 of the transfer valve is insufficient to cause the valve to change from its stable position 56 to its other stable position 52.

When the transfer valve 50 is in its stable position 56, the output from the auxiliary pump 30 enters the transfer valve from output line 40 and is returned directly to the reservoir 48 through the return line 42. However, should the mass flow rate through the orifice 58 and the check valve 60 decrease below a predetermined level, the transfer valve 50 shifts to its intermediate, unstable position 54 wherein the output from the steering gear through line 68 is connected to both of the pump reservoirs 46 and 48 and then is shifted to its stable position 52.

When the transfer valve 50 is held in its stable position 52, the output from the auxiliary pump 30 passes through output line 40, through the transfer valve, and into the hydraulic line or passage 78. Fluid pressure is applied at this point through the passage 72 to the pilot area 74 of the transfer valve which tends to maintain the valve in its stable position 52. Also, fluid flows into the passage 70 to the input line 62, and from there, into the steering gear 24. The fluid flowing out of the steering gear enters line 68, passes once again through the transfer valve 50, and is returned by return line 42 to the auxiliary pump reservoir 48. At this time, the pressure in the line 62 is greater than the pressure in the line 20 so that flow through the check valve 60 and orifice 58 is prevented. Because the auxiliary pump 30 is operated by the vehicle drive wheels rather than by the engine, it will continue to produce an output as long as the drive wheels rotate. However, in practice, a usable output from this pump is and need only be produced until the vehicle speed has decreased to a low predetermined value, such as within the range from 2 to 5 miles per hour.

FIG. 3 is a detailed sectional view of the power steering gear assembly illustrated schematically in FIG. 2. FIG. 3 shows a portion of the typical steering assist mechanism 24 having an input shaft 80, which normally is connected with the vehicle's steering wheel. Shown mounted integrally with the steering assist mechanism 24 is the combination mass flow rate sensing means and transfer valve, these being designated generally by the numeral 28. Specifically, the mass flow rate sensing means is comprised of the orifice 58 and the check valve 60. The transfer valve is specifically denoted by the numeral 50.

The steering assist mechanism or steering gear 24 conventionally has an open-center valve spool 82 which moves to the right or to the left as viewed in FIG. 3 in accordance with rotation of the steering gear input shaft 80. Movement of the steering gear valve spool 82 in either direction causes an increase in hydraulic fluid pressure applied to the steering mechanism through the hydraulic input passage 62. Hydraulic fluid flows out of the steering assist mechanism 24 through the output line formed by the chamber 84 and the passage 68 connected thereto.

The transfer valve 50 includes a valve body 86 having a cylindrical opening 88 therein in which axially movable spool 90 is located. The valve spool 90 has equal diameter lands 92, 94, 96, and 98. The valve body 86 has ports 100 and 102. The width of the land 94 must be less than the width of the port 100 in order for the transfer valve 50 to provide an unrestricted passage for the hydraulic fluid flowing from the steering gear 24 through the passage 68 for all valve spool positions. This insures the availability at all times of an unrestricted passage for hydraulic fluid displaced by the valve spool 90 from the pilot areas 66 and 74 to allow rapid operation of the transfer valve through intermediate position 54 shown in FIG. 2. The width of the land 96 should be equal to or greater than the width of the port 102. The projection 104 at the left end of the valve spool 90 limits its travel to the left as viewed in FIG. 3. Spring 76 located in the pilot area 74 of the transfer valve 50 urges the valve spool 90 toward the left. When there is fluid input pressure through the hydraulic input line 20 from the engine driven primary pump 10 through the passage 64 into the pilot area 66 at the left end of the valve spool 90, the valve spool is urged toward the right against the combined force of the bias spring 76 with the force produced by fluid pressure in pilot area 74. Travel of the valve spool toward the right is limited by the projection 106. The effective areas of the valve spool 90 in pilot areas 66 and 74 should be equal.

FIG. 3 illustrates the position of the valve spool 90 when neither the engine driven primary pump 10 nor the auxiliary pump 30 are producing a fluid pressure as would be the situation with the vehicle standing still and the engine at rest. This valve position is also the position it assumes upon failure of the primary hydraulic supply system and it corresponds to the stable position 52 illustrated schematically in FIG. 2.

If the vehicle engine is running and the engine driven hydraulic pump 10 is producing a normal fluid output, then the pressure acting on the pilot area 66 of the valve spool 90 is sufficient to move it toward the right against the force of the bias spring 76 combined with the force produced by the fluid pressure in passage 70 acting through the passsage 72 on the area of the spool located in the pilot area 74. This condition is maintained only as long as the fluid mass flow rate through the orifice 58 and the series connected check valve 60 is sufficient to produce a predetermined pressure drop between the hydraulic input line 20 and the passage 70 so that the force acting in the pilot area 66 on the valve spool 90 urging it toward the right is greater than the combined forces produced by the bias spring 76 and the fluid in the pilot chamber 74 urging the valve spool toward the left.

As an example of the operation of the transfer valve and sensing means in the event of a failure in the primary hydraulic supply circuit, it may be assumed that a leak develops in the primary return line 22. In that event, the hydraulic fluid level in the primary pump reservoir 46 gradually decreases as the pump continues to deliver fluid to the steering assist mechanism 24. The pump will begin to deliver an air-hydraulic fluid mixture. Because of the reduced density of this air-hydraulic fluid mixture, the pressure drop across the orifice 58 and the check valve 60 decreases. If the operation of the transfer valve 50 were controlled only by the output pressure of the primary hydraulic pump 10, the failure could go undetected because of the primary hydraulic pump 10 acting as an air compressor and maintaining the output pressure substantially constant. However, with the apparatus of the invention, the mass flow rate is sensed and this decreases when the density of the hydraulic fluid decreases so that the valve spool 90 moves through its unstable intermediate position 54 (FIG. 2) into its stable position 52, the position of the valve spool illustrated in FIG. 3, wherein hydraulic fluid is supplied by the auxiliary pump 30. This result is achieved because the reduced mass flow rate through the orifice produces a reduction in the fluid pressure acting through the passages 70 and 72 on the portion of the valve spool 90 located in the pilot area 74 of the transfer valve.

Based upon the foregoing description of the invention, what is claimed and desired to be protected by Letters Patent is:

1. A vehicle power steering system which comprises: a primary pump having an output line and a return line; a secondary pump having an output line and a return line; means connected with said primary pump output line for sensing mass flow rate of fluid therein; and valve means connected to, and for controlling fluid flow in, said primary and secondary output and return lines, said valve means being connected to said sensing means and being responsive at a predetermined mass flow rate sensed thereby to alter the fluid flow circuits of said primary and secondary pumps.

2. A vehicle power steering system in accordance with claim 1, wherein said means for sensing mass flow rate of fluid comprises an orifice connected with said primary pump output line.

3. A vehicle power steering system in accordance with claim 2, wherein said means for sensing mass flow rate of fluid further includes one-way valve means connected in series with said orifice.

4. A vehicle power steering system, which comprises: a primary pump having an output line and a return line; a secondary pump having an output line and a return line; means connected with said primary pump output line for sensing mass flow rate of fluid therein; a steering assist mechanism; and transfer valve means connected to, and for controlling fluid flow in, said primary and secondary output and return lines, said valve means having a first position in which said primary pump output and return lines are connected to said steering assist mechanism and wherein said secondary pump output and return lines are connected together by said valve means, and said valve means having a second position wherein said secondary pump output and return lines are connected to said steering assist mechanism for fluid flow therethrough.

5. A vehicle power steering system in accordance with claim 4, wherein said means for sensing mass flow rate of fluid comprises fluid flow restrictive means for producing a fluid pressure differential.

6. A vehicle power steering system in accordance with claim 4, wherein said means for sensing mass flow rate of fluid comprises an orifice connected in series with one-way valve means to produce a pressure differential in the fluid output from said primary pump when said valve means are in said first position.

7. A vehicle power steering system in accordance with claim 6, wherein said transfer valve means further include means responsive to a reduction below a predetermined level of the pressure differential across said orifice and one-way valve means to shift said transfer valve means from its first position to its second position.

8. A vehicle power steering system in accordance with claim 7, wherein said transfer valve means has a third unstable intermediate position wherein the output from said steering assist mechanism is connected to said return lines of said primary and secondary pumps.

9. A vehicle hydraulic power steering system, which comprises: a primary hydraulic fluid pump having an output line and a return line; an auxiliary hydraulic fluid pump having an output line and a return line; a fluid-controlled open-center-valve steering assist mechanism having input and output lines connected thereto; a transfer valve connected to the input and output lines of said steering assist mechanism, to the ouput line of said auxiliary pump, and to the return lines of said primary and auxiliary pumps, said transfer valve having a first position wherein said output line of said steering assist mechanism is connected to said return line of said primary pump and wherein said output line of said auxiliary pump is connected to said return line of said auxiliary pump, and said transfer valve having a second position wherein said output line of said auxiliary pump is connected to said input line of said steering assist mechanism and wherein said output line of said steering assist mechanism is connected to said return line of said auxiliary pump, said transfer valve further including first pilot means connected to said output line of said primary pump for urging said transfer valve to its first position and second pilot means connected to said input line of said steering assist mechanism for urging said transfer valve to its second position; and orifice and one-way valve means for sensing mass flow rate of fluid flowing therethrough, said orifice and one-way valve means being connected between said output line of said primary pump and said input line of said steering assist mechanism.

10. A vehicle hydraulic power steering system in accordance with claim 9, wherein said transfer valve has a third unstable intermediate position wherein said output line of said steering assist mechanism is connected to said return lines of said primary and auxiliary pumps.

11. In a vehicle hydraulic power steering system including a primary pump and an auxiliary pump and a steering assist mechanism connected to a transfer valve having a first position wherein said primary pump is connected to said steering assist mechanism and having a second position wherein said auxiliary pump is connected to said steering assist mechanism, the improvement which comprises, in combination, means for sensing mass flow rate of fluid from said primary pump and for producing a pressure differential corresponding thereto; and means for holding said valve in said first position when said pressure differential is above a predetermined level and for holding said valve in said second position when said pressure differential is below said predetermined level.

\* \* \* \* \*